(No Model.) 2 Sheets—Sheet 2.
J. E. BANCROFT & A. U. BETTS.
VULCANIZER FOR REPAIRING BICYCLE TIRES.
No. 567,185. Patented Sept. 8, 1896.
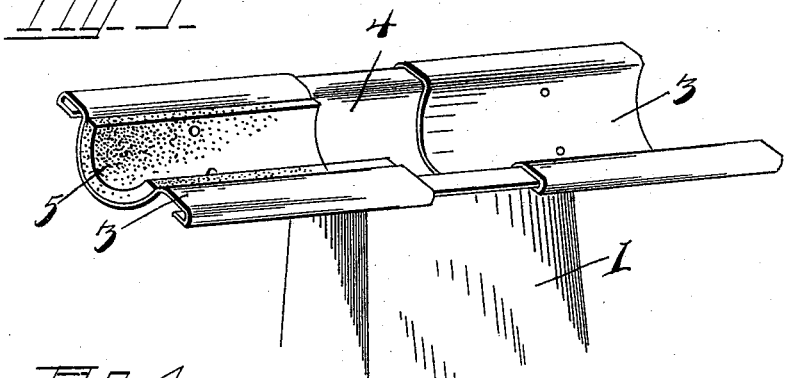
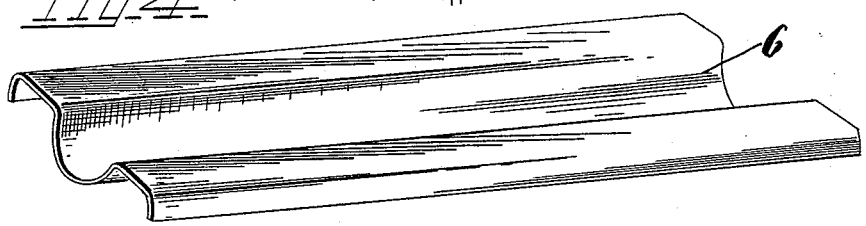
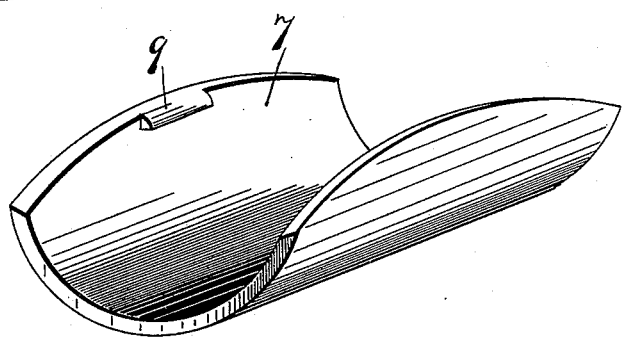
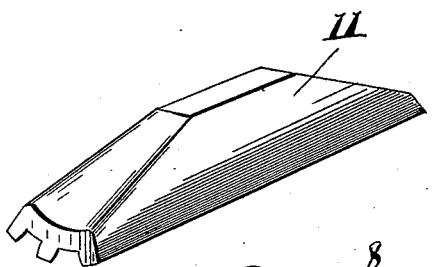
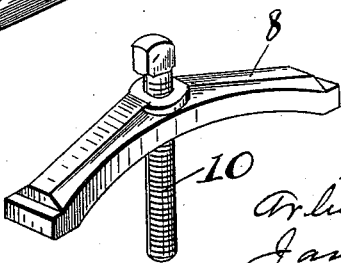
WITNESSES
Earl H. Keller.
Maud Schumacher.
INVENTORS
Arlington U. Betts
James E. Bancroft
By William Webster
atty

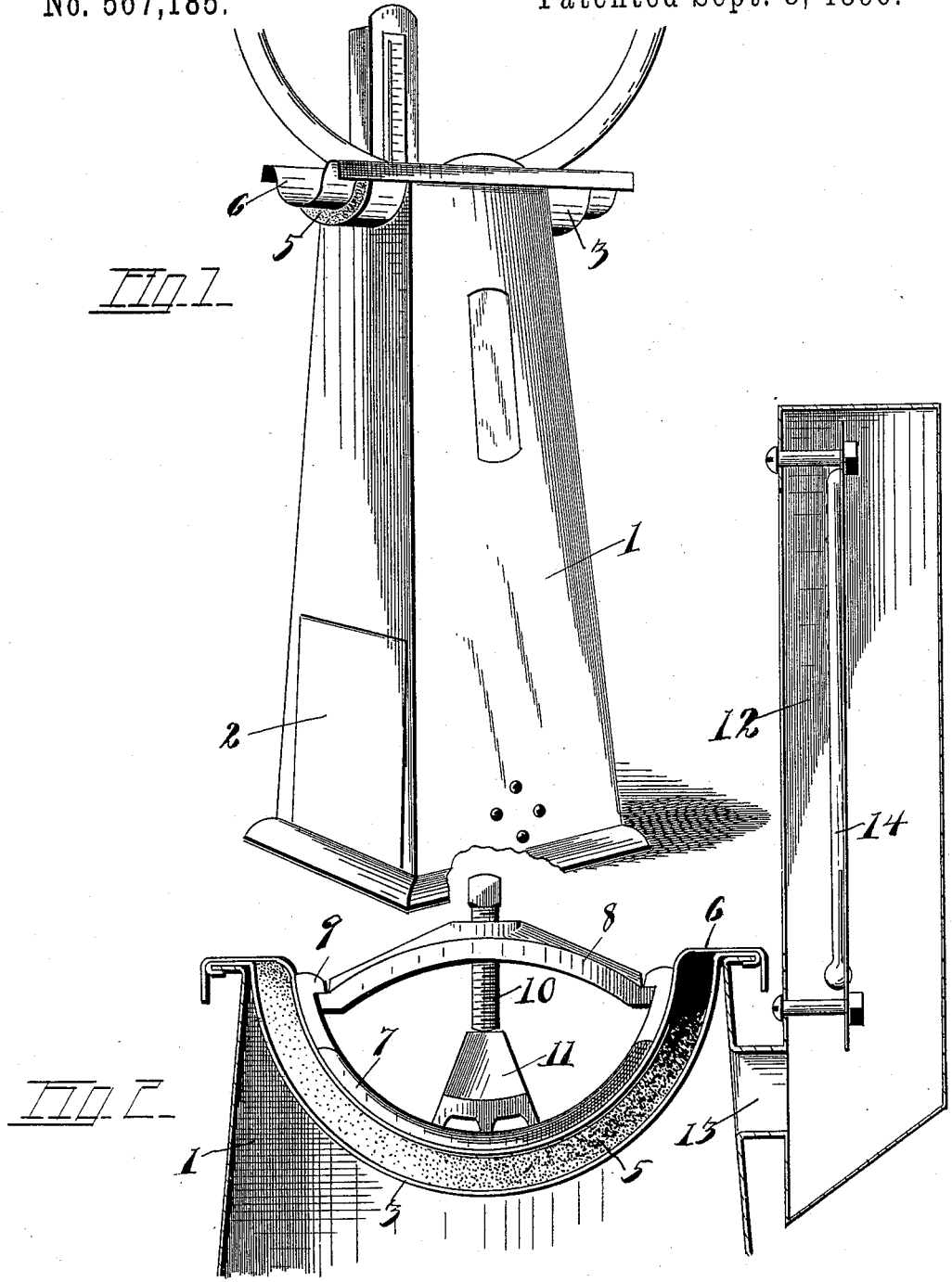

UNITED STATES PATENT OFFICE.

JAMES E. BANCROFT AND ARLINGTON U. BETTS, OF TOLEDO, OHIO.

VULCANIZER FOR REPAIRING BICYCLE-TIRES.

SPECIFICATION forming part of Letters Patent No. 567,185, dated September 8, 1896.

Application filed January 25, 1896. Serial No. 576,832. (No model.)

*To all whom it may concern:*

Be it known that we, JAMES E. BANCROFT and ARLINGTON U. BETTS, of Toledo, county of Lucas, and State of Ohio, have invented certain new and useful Improvements in Vulcanizers for Repairing Bicycle-Tires; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to a vulcanizer having especial relation to an apparatus for use in repairing bicycle-tires, and has for its object to provide an apparatus of economical construction, thereby rendering it possible to supply not only the private user, but repair-shops generally. In accomplishing this object we have found it necessary to provide means, first, for clamping the tire in its essentially normal circularity; second, in maintaining its normally tubular form, and, third, in concentrating the heat necessary to vulcanization to the point of fracture. In carrying out these objects we have provided, first, a stand, and have chosen as the most practical form one of pyramidal shape, thereby giving a broad base to support the same and allowing of a minimum lightness of weight.

In the drawings, Figure 1 is an elevation of the vulcanizer, showing a portion of the tire in position for mending. Fig. 2 is a transverse section of the vulcanizer, showing the clamp for holding the tire in position for vulcanization at the point of fracture. Fig. 3 is an elevation of the separable adjustable sections, showing on the left-hand side the asbestos covering in place and upon the opposite side the covering omitted. Fig. 4 is an elevation of a metal thermal shield. Fig. 5 is an elevation of a form, after receiving the cement, having clamping-lugs thereon. Fig. 6 is the clamping-foot employed to clamp the tire while in the act of vulcanization; and Fig. 7 is an elevation of the clamping-yoke, showing the screw-threaded stem therein.

In carrying out our invention we employ a base 1, having a door 2 for the reception of a lamp or any other caloric-generator. At the top of base 1 are adjustable telescopic sections 3. Sections 3 are adjustable, thereby forming an area 4 to admit heat to any ordinary length of fractured tire. Upon sections 3 is a covering 5 of asbestos or other suitable insulating material.

6 designates a metallic closure of a contour to fit sections 3 and the covering 5 thereon, and also closes the area 4.

7 designates a former of a contour to fit the closure 6, and also forms the lower portion of a clamp, of which the yoke 8 forms the upper part, being held in place by lugs 9 upon the former 7. In yoke 8 is a screw-threaded stem 10, the end of which contacts with the clamping-foot 11, between which and the former 7, having a suitable covering thereon, the fractured tire is held while being vulcanized.

12 designates a chamber connected with the base 1 at 13, and contains therein a thermometer 14.

In operation the fractured portion of the tire is first carefully trimmed and backed on the inside thereof with any suitable fabric. The cut-out portion of tire is then filled with gum-rubber or rubber cement until it attains a thickness corresponding with the remaining portion of the tire. Former 7 is then coated with suitable cement (preferably a mixture of plaster-of-paris, gum-arabic, and dextrin) to a uniform thickness, having a smooth curved surface of a contour approximately that of the tire to be mended. We may, however, employ any cement suitable for the purpose that will not chip or fracture when subjected to great heat and that will yield a perfectly smooth surface when formed. Telescopic sections 3 are then separated to leave the area 4 of a width depending upon the length of the fracture of the tire. Closure 6 is then placed upon the sections 3, whereby the heat is confined in the vulcanizer and a portion of the closure corresponding to the area 4 is exposed to the heat within, the remaining portion being protected from the heat by the asbestos covering 5 on the sections 3. Former 7 is then placed upon the closure 6 immediately over the area 4, whereby it is also exposed to the heat. The portion of tire to be mended is now placed upon the former 7 with the portion containing the gum-rubber pressed firmly against the cemented portion and held securely in place by the foot 11, thereby excluding the atmosphere and holding the rubber contained in the cavity to be mended under pressure.

We have found that a temperature of 260° is sufficient to fully vulcanize the gum-rubber and form a perfect union of the body portion of tire and the gum-rubber used in filling the fracture.

What we claim is—

1. A vulcanizer comprising a base portion having a caloric agency located therein and an adjustable orifice at the top with means for clamping the article to be vulcanized in coincidence with the orifice.

2. In a vulcanizer, a housed base portion having an opening at the top adjustable closures to the opening provided with insulating material, and means for clamping the article to be vulcanized with the point of fracture in coincidence with the opening with an interposed medium between the opening in the base and the article to be vulcanized.

3. In a vulcanizer, a base portion having a top opening, adjustable sections to regulate the opening having a coating of an insulating material, a supplemental plate to fit the adjustable sections and a clamp for securing the article to be vulcanized in firm fixed relation with the opening in the base.

4. In a vulcanizer, a base portion adapted to receive a lamp or analogous heating agency, a thermometer in communication with the base, an adjustable closure to the top of the base, a supplemental plate to closely fit the closure-sections, a former of a contour coincident with that of the plate having a clamp for securing the article to be vulcanized in coincidence with the opening of the base.

5. In a vulcanizer, a conduit for heat provided with adjustable closure-sections having an asbestos coating of a contour of the form of article to be vulcanized, a plate supplemental to the adjustable sections having a form of like contour and a former of a coincident contour provided with a coating of suitable cement, and a clamp for holding the article to be vulcanized in firm relation thereto when subjected to heat.

6. As an article of manufacture, a vulcanizer, comprising a receptacle for heating medium, an adjustable orifice having an insulating medium and a clamp for securing the article to be vulcanized in coincidence with the orifice.

In testimony that we claim the foregoing as our own we do affix our signatures in presence of two witnesses.

JAMES E. BANCROFT.
ARLINGTON U. BETTS.

Witnesses:
CARL H. KELLER,
MAUD SCHUMACHER.